(12) United States Patent
Schulz et al.

(10) Patent No.: US 11,143,282 B2
(45) Date of Patent: Oct. 12, 2021

(54) ROLLING-ELEMENT BEARING TRANSMISSION

(71) Applicant: Aktiebolaget SKF, Gothenburg (SE)

(72) Inventors: Ingo Schulz, Gerolzhofen (DE); Bernd Stephan, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 775 days.

(21) Appl. No.: 15/894,298

(22) Filed: Feb. 12, 2018

(65) Prior Publication Data

US 2018/0231113 A1 Aug. 16, 2018

(30) Foreign Application Priority Data

Feb. 15, 2017 (DE) .......................... 102017202444.5

(51) Int. Cl.
| | | |
|---|---|---|
| *F16H 1/28* | (2006.01) | |
| *F16H 1/32* | (2006.01) | |
| *F16C 19/18* | (2006.01) | |
| *F16H 49/00* | (2006.01) | |
| *F16H 57/021* | (2012.01) | |
| *F16C 19/54* | (2006.01) | |
| *F16H 25/06* | (2006.01) | |

(52) U.S. Cl.
CPC ......... *F16H 49/001* (2013.01); *F16C 19/182* (2013.01); *F16H 1/28* (2013.01); *F16H 1/32* (2013.01); *F16H 57/021* (2013.01); *F16C 19/184* (2013.01); *F16C 19/548* (2013.01); *F16C 2361/61* (2013.01); *F16C 2361/65* (2013.01); *F16H 2001/2881* (2013.01); *F16H 2001/325* (2013.01); *F16H 2025/063* (2013.01)

(58) Field of Classification Search
CPC ....... F16H 2001/2881; F16H 2057/127; F16H 2057/126; F16H 1/2863; F16H 1/2818; F16H 1/32–2001/328
USPC .......................................................... 475/341
See application file for complete search history.

(56) References Cited

U.S. PATENT DOCUMENTS

| | | | | |
|---|---|---|---|---|
| 2,250,259 A | * | 7/1941 | Foote, Jr. ................. | F16H 1/32 475/177 |
| 2,966,078 A | * | 12/1960 | Wright .................. | B65G 23/08 475/149 |
| 3,056,315 A | * | 10/1962 | Mros ........................ | F16H 1/32 475/176 |

(Continued)

FOREIGN PATENT DOCUMENTS

| | | |
|---|---|---|
| DE | 2405742 A1 | 8/1975 |
| DE | 112007000565 T5 | 1/2009 |

(Continued)

*Primary Examiner* — Sherry L Estremsky
(74) *Attorney, Agent, or Firm* — J-Tek Law PLLC; Scott T. Wakeman; Mark A. Ussai

(57) ABSTRACT

A rolling-element bearing transmission includes a rotor configured to rotate a shaft relative to a stator and a rotatable output ring that includes a first rolled-on surface element. The shaft includes at least one second rolled-on surface element, and the stator includes a third rolled-on surface element. First and second pluralities of rolling elements are located between the shaft and the stator and between the shaft and the output ring. Also, a transmission mechanism transmits a rotary motion of the shaft to the output ring with a speed reduction such that the output ring rotates at a lower speed than the shaft.

13 Claims, 3 Drawing Sheets

(56) References Cited

U.S. PATENT DOCUMENTS

| | | | | |
|---|---|---|---|---|
| 3,453,907 | A | * | 7/1969 | Masaaki ............ F16H 1/46 |
| | | | | 475/176 |
| 4,060,334 | A | * | 11/1977 | Wagner ............ B23B 45/008 |
| | | | | 408/126 |
| 5,286,236 | A | | 2/1994 | Hosokawa et al. |
| 5,293,107 | A | * | 3/1994 | Akeel ............ B25J 9/08 |
| | | | | 310/83 |
| 5,366,423 | A | * | 11/1994 | Mori ............ F16H 1/28 |
| | | | | 475/338 |
| 5,385,514 | A | * | 1/1995 | Dawe ............ F16H 13/06 |
| | | | | 475/336 |
| 5,704,864 | A | * | 1/1998 | Yanagisawa ............ F16H 1/28 |
| | | | | 475/149 |
| 6,033,336 | A | * | 3/2000 | Bae ............ F16H 1/46 |
| | | | | 475/341 |
| 7,815,535 | B2 | * | 10/2010 | Ai ............ H02K 7/116 |
| | | | | 475/149 |
| 7,901,317 | B2 | * | 3/2011 | Yamamoto ............ F16H 1/32 |
| | | | | 475/168 |
| 8,827,854 | B2 | * | 9/2014 | Nomura ............ F16C 33/6681 |
| | | | | 475/170 |
| 9,512,900 | B2 | * | 12/2016 | Hederstad ............ F16H 1/2836 |
| 2007/0179011 | A1 | * | 8/2007 | Choi ............ B62D 5/008 |
| | | | | 475/331 |
| 2009/0178506 | A1 | * | 7/2009 | Yamamoto ............ B25J 9/102 |
| | | | | 74/490.03 |

FOREIGN PATENT DOCUMENTS

| | | | | |
|---|---|---|---|---|
| DE | 102008039942 A1 | | 3/2010 | |
| DE | 102012207255 A1 | * | 11/2013 | ............ F16H 57/082 |
| DE | 102012210465 A1 | * | 12/2013 | ............ F16H 1/2863 |
| DE | 112013004710 T5 | | 6/2015 | |
| FR | 890697 A | * | 2/1944 | ............ F16H 1/2818 |
| GB | 1021644 A | * | 3/1966 | ............ E06B 9/88 |
| WO | 2015067623 A2 | | 5/2015 | |

* cited by examiner

ROLLING-ELEMENT BEARING TRANSMISSION

CROSS-REFERENCE

This application claims priority to German patent application no. 10 2017 202 444.5 filed on Feb. 15, 2017, the contents of which are fully incorporated herein by reference.

TECHNOLOGICAL FIELD

The invention relates to a rolling-element bearing transmission.

BACKGROUND

In many areas of technology there is a requirement that a mechanism must be designed for carrying out a highest-possible number of cycles of rapid pivoting movements, in particular in connection with a comparatively greatly rotational-speed-reduced drive, and the mechanism should simultaneously be durable, robust, simple, and inexpensive.

SUMMARY

An aspect of the disclosure is to provide an improvement in this respect.

The rolling-element bearing transmission according to the disclosure offers the following advantages here: The pure rolling-element bearing function per se and the high drive reduction are, so to say, merged in one structural unit. Using the inventive rolling-element bearing transmission even comparatively small-angled, fast, frequently repetitive pivoting movements are realizable, whereas the internal rolling partners are advantageously subjected to a real rotation and not just constantly moved back and forth against one another in a way that is undesired per se, which can cause known problems such as, for example, brinelling. A grease lubrication of the rolling partners can thereby also advantageously be instituted, whereby an expensive oil lubrication is not required. However, the inventive rolling-element bearing transmission can also of course for whatever reason be used and driven in an oil-lubricated manner. Furthermore, using the inventive rolling-element bearing transmission large step-ups or reductions of 1:50, 1:100, 1:200 or even more are achievable. However, the invention is thus also particularly suited for industrial robot technology, in particular for the joint regions of robotic arms, where high reductions are required and frequent, rapid pivoting movements are to be carried out over the entire service life. However, they are also suited for pitch adjustment in the blades of wind turbines.

A further aspect of the disclosure comprises a rolling-element bearing transmission that includes a rotor configured to rotate a shaft relative to a stator and a rotatable output ring comprising a first rolled-on surface element. The shaft includes at least one second rolled-on surface element and the stator includes a third rolled-on surface element. The rolling-element bearing transmission also includes a first plurality of rolling elements between the first rolled-on surface element and the at least one second rolled-on surface element and a second plurality of rolling elements between the third rolled-on surface element and the at least one second rolled-on surface element. The bearing transmission also includes transmission means for transmitting a rotary motion of the shaft to the output ring with a speed reduction such that the output ring rotates at a lower speed than the shaft.

Another aspect of the disclosure comprises a rolling-element bearing transmission that includes a rotor configured to rotate a shaft relative to a stator, the stator comprising an internal gear. The transmission also includes a rotatable output ring comprising a first rolled-on surface element, and the output ring includes an internal gear. The shaft includes a first second rolled-on surface element and a second second rolled-on surface element axially spaced from the first second rolled-on surface element by a gap, and the stator includes a third rolled-on surface element and has an internal gear. A first plurality of rolling elements is located between the first rolled-on surface element and the first second rolled-on surface element and a second plurality of rolling elements is located between the third rolled-on surface element and the second second rolled-on surface element. The bearing transmission includes a plurality of double gears each comprising a first gear having teeth and a first diameter and a second gear having teeth and a second diameter larger than the first diameter, and the first gear and second gear of each double gear are fixedly mounted to a shaft for rotation with the shaft. The shaft connects the first second rolled-on surface element to the second second rolled-on surface element, and the teeth of the first gear of each double gear are meshed with the internal gear of the stator and the teeth of the second gear of each double gear are meshed with the internal teeth of the output ring.

Further advantages, features and details of the invention arise from the exemplary embodiments of the invention described in the following with the assistance of the Figures.

DETAILED DESCRIPTION

Figure 1:
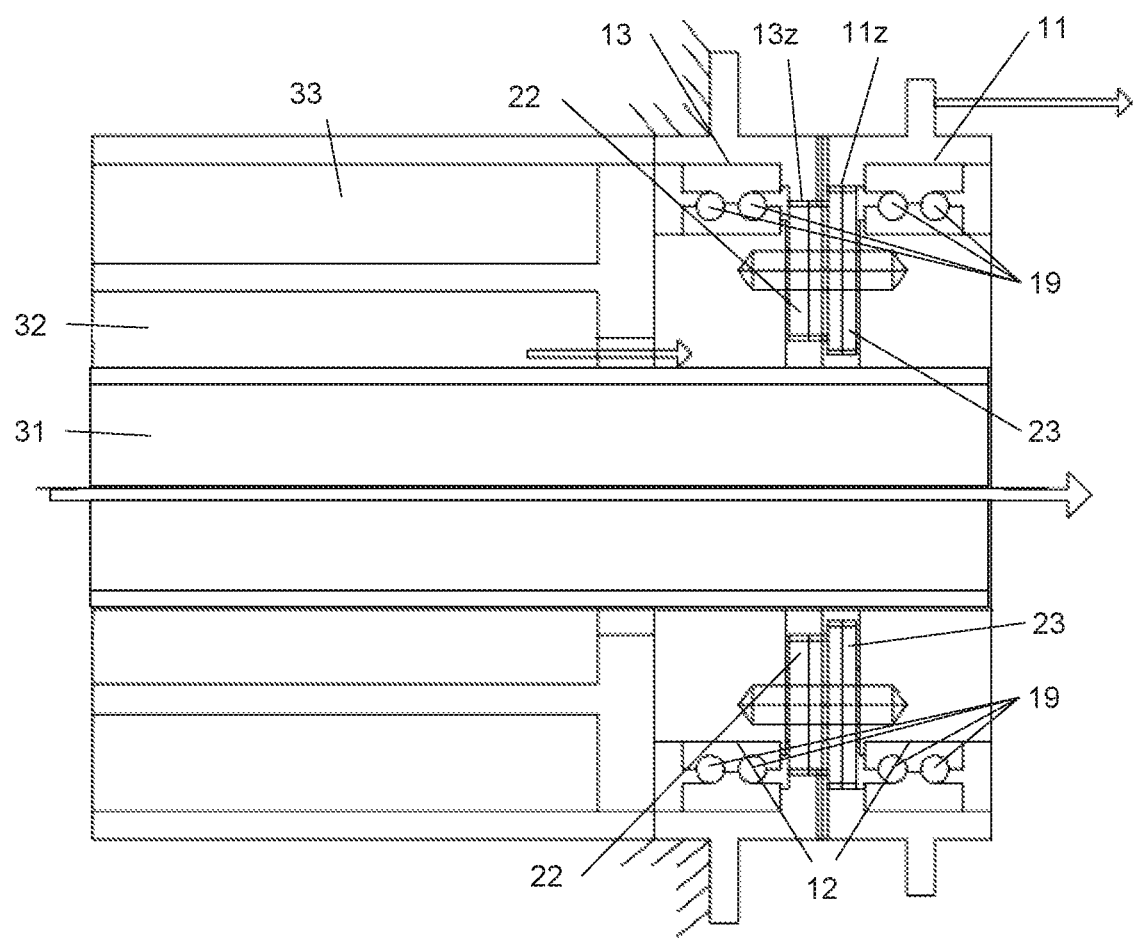
FIG. 1 shows a longitudinal section through a rolling-element bearing transmission according to the invention including two axially adjacently disposed rolled-on surface elements and a planetary gear-type transmission.

FIG. 1 shows a longitudinal section through a rolling element bearing transmission as an exemplary embodiment of the invention, wherein only the section surfaces are depicted, without hatching. Here the rolling element bearing transmission comprises a first, second, and third rolled-on surface element 11, 12, and 13, which are all configured ring- or hollow-cylinder-shaped. Here the third and the second rolled-on surface element 13 and 12 as well as the first and the second rolled-on surface element 11 and 12 are respectively configured with respect to each other in the manner of a double row angular contact ball bearing, wherein the first and third rolled-on surface element 11 and 13 are, so to say, disposed axially adjacent to each other.

Other bearing types, for example, deep groove ball bearings and/or tapered roller bearings are of course also usable. Thus the rolled-on surface elements 11, 12, 13 are, for example, formed from a rolling-element bearing steel and comprise, in the region of the two rows of rolling elements formed as balls 19, hardened, ground, and/or honed or comparably produced raceways, on which the balls 19 roll. The balls 19 of each of the two rows here are disposed or snapped into a not-depicted cage that is manufactured, for example, from plastic material, which cage prevents a mutual contacting of the balls 19. The balls 19 can also be formed from rolling-element bearing steel, and also from other metal, in particular iron alloys, from ceramic, or other suitable materials. Furthermore, the rolling-element space containing the balls 19 is radially outward sealed by two annular seal elements disposed to the left and right on one of the rolled-on surface elements 13, 11, or 12, or between the rolled-on surface elements 13 or 11 and 12, wherein they can be contacting seals including a seal lip as well as gap seals, for example, so-called cover plates. The lubrication inside the sealed rolling-element space here is a grease lubrication preferably designed for the entire service life.

In FIG. 1 the first and the third rolled-on surface element 11 and 13 are configured at least two-piece, wherein one of the pieces that includes the raceways for the balls 19 is a common outer ring of a double row angular contact ball bearing. The second rolled-on element 12 is configured multi-piece, wherein two of the pieces that include the raceways for the balls 19 are common inner rings of double row angular contact ball bearings. Due to this design essentially catalog-listed double row angular contact ball bearings can advantageously be used. In other embodiments a one-piece uniform-material configuration can also of course be used.

A plurality of pairs of gears 22 and 23, distributed in the circumferential direction and rotatably supported in the second rolled-on surface element 12 are provided inside the second rolled-on surface element 12 and axially between the two angular contact ball bearings. In each pair the two gears 22 and 23 are fixedly connected to each other, for example, by being configured one-piece and uniform-material as a double gear. The bearing assemblies of the gears 22, and 23 can be constructed in a space-saving manner on a bolt by needle bearings or needle roller and cage assemblies or by sliding bearings. The gears 22 are disposed and configured here such that they mesh with an internally geared gear region 13z formed on the third rolled-on surface element 13, whereas the gears 23 are disposed and configured such that they mesh with an internally geared gear region 11z formed on a first rolled-on surface element 11.

The second rolled-on surface element 12 sits on a hollow shaft 31. Furthermore a rotor 32 of an electric motor is connected to the hollow shaft 31, wherein the stator 33 of the electric motor is connected to the third rolled-on surface element 13 that is fixed relative to the other rolled-on surface element. The hollow shaft 31 and the second rolled-on surface element 12 connected thereto are thus drivable via the electric motor, wherein the output is effected via the first rolled-on surface element 11.

Here the rolling-element bearing transmission of FIG. 1 steps up from drive to output as follows: The gear 22 meshing with the gear region 13z of the third rolled-on surface element 13 is set into a rotation about its own axis of rotation by the rotating of the hollow shaft 31. Thus the gears 23 are also rotated along, whose rotation moves the first rolled-on surface element 11 by their meshing with the gear region 11z.

With four pairs of gears 22 and 23 disposed distributed over the circumference a freedom from backlash of the rolling-element bearing transmission can thereby be achieved by, for example, two mutually opposing pairs opposite the two other mutually opposing pairs being preloaded in opposite directions with respect to one another, for example, by an appropriate spring mechanism. In another embodiment the freedom from backlash can also be generated by the gear region 11z or 13z being configured radially inward with a slight overlap with respect to the gear pairs, e.g., in the range of tenths of mm. An installation can then in particular be effected by heating the gear region 11z and 13z, wherein the gear region 11z and 13z are to be configured with appropriate thickness and, for example, sufficiently thin-walled to achieve a desirable spring characteristic curve.

In the rolling-element bearing transmission of FIG. 1 a brake (not depicted in more detail), and sensors (not depicted in more detail) for capturing the most diverse values as well as other extension elements can of course be added as needed.

Using the rolling-element bearing transmission even comparatively small-angled pivot movements can thus also be achieved between the first rolled-on surface element 11 and the third rolled-on surface element 13 with a large reduction ratio that is favorable in terms of driving technology, wherein the rolling partners used are at the same time advantageously subjected to an actual rotation and not just constantly moved back and forth in a way that is undesired per se, which can cause known problems such as, for example, brinelling. A grease lubrication of the rolling partners can thereby also advantageously be instituted, whereby an expensive oil lubrication is not required. However, the inventive rolling-element bearing transmission can also of course for whatever reason be used and driven in an oil-lubricated manner.

Thus high reductions can be achieved with this arrangement with the advantage that all parts rotate, and thus with the advantage of good lubrication conditions. However, the invention is thus also particularly suited for robot technology, in particular for the joint regions of robotic arms, where high reductions are required and sustained pivoting movements also must be carried out.

Figure 2:
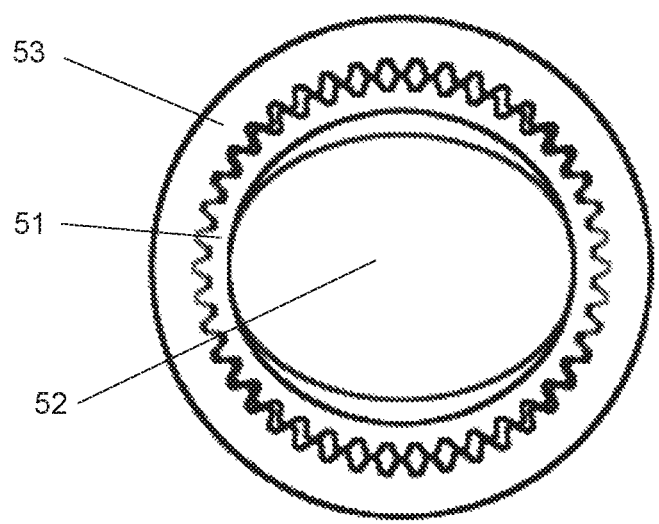
FIG. 2 shows a principal cross-sectional view of a strain wave gear usable as a transmission.

In other embodiments, instead of the planetary-transmission-type configuration of FIG. 1 other suitable transmission- or conversion-mechanisms can be used, for example, a strain wave gearing, wherein FIG. 2 shows a principal cross-sectional depiction of a strain wave gearing. Referring to FIG. 1 the gears 22 and 23 as well as the gear region 11z are thus omitted and an elliptical disc 52 as wave generator and a so-called flexspline 51 take their place. The internally geared outer ring 53 of the strain wave gearing is formed, for example, from the gear region 13z. Here the elliptical disc 52 is formed on the or from the hollow shaft 31 or the second rolled-on surface element 12. The flexspline 51 disposed between the elliptical disc 52 and the internally geared outer ring 53 is connected to the first rolled-on surface element 11 or formed therefrom.

A not-depicted rolling-element bearing including a thin deformable ring is usually shrunk-on onto the elliptical disc 52. The elliptical disc 52 is the drive of the transmission. The flexspline 51 is a deformable cylindrical steel bush including external gear. This steel bush is the output. The external gear of the steel bush has fewer teeth than the internal gear of the outer ring 53. As a rule this difference is two teeth. With each revolution flexspline 51 and the outer ring 53 thus perform a relative movement about two teeth.

The driven elliptical disc 51 deforms the thin-walled steel bush. The external gear of the steel bush thereby engages into the internal gear of the outer ring 53 in the region of the major elliptical axis. Due to the so-called fixed outer ring 53, with a revolution of the drive, the steel bush (the output) lags due to the small number of teeth relative to the outer ring 53.

Very large reductions are obtained due to high tooth counts of the gears. For example, with 200 teeth for the inner gear and 198 teeth for the steel bush the reduction is 198:2=99 when the elliptical disc 52 is fixed as drive and the steel bush as the output. With 99 revolutions of the elliptical disc 52 the deformable steel bush rotates once. Approximately 30% of the teeth are involved in the transmission. Together with the high reduction ratio of 30:1 up to 320:1 the strain wave gearing is torsion-resistant and free of backlash. Depending on the embodiment, the positioning accuracy is better than 30 angle seconds.

Figure 3:
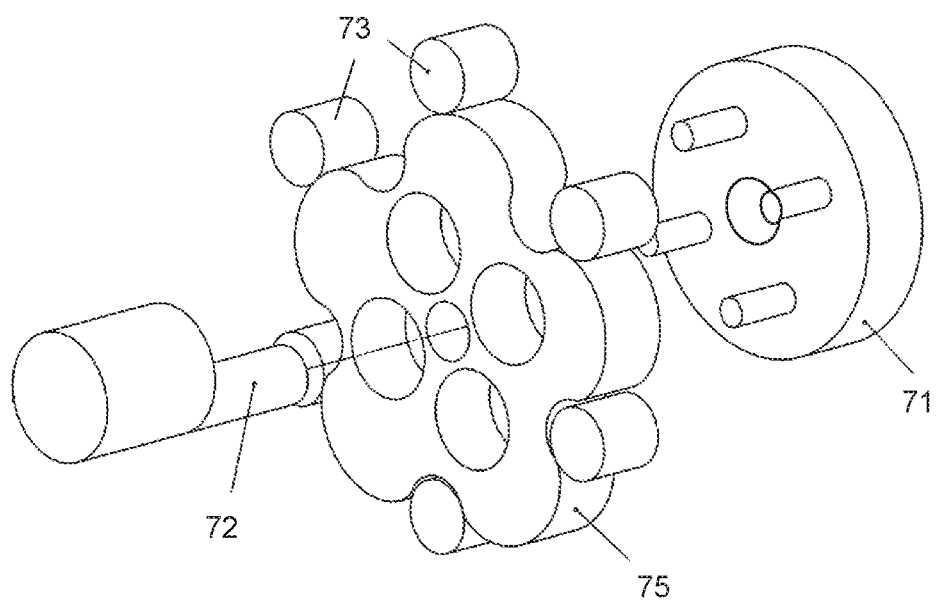
FIG. 3 shows a schematic sketch of a cycloidal drive in perspective exploded view usable as a transmission.

The strain wave gearing, also called a Harmonic Drive® or ellipto-centric gearing, is thus a transmission including an elastic transmission element that is characterized by high step-up and stiffness. A further backlash-free transmission for transfer of large torques is the cycloidal drive. The cycloidal drive has a higher efficiency than the wave strain wave gearing (95% compared to 85%), but it is more expensive to manufacture. A cycloidal drive can also be used instead of the planetary-transmission-type configuration of FIG. 1; for this purpose FIG. 3 shows a schematic sketch of a cycloidal drive in perspective exploded view.

Referring to FIG. 1, the gears 22 and 23 as well as the gear region 11z and 13z are replaced by an eccentric 72, a cam disc 75, bolts 73, for example, a not-depicted bolt ring, and a bolt disc 71. Here the eccentric 72 is formed on or from the hollow shaft 31 or also from the second rolled-on surface element 12. The bolts 73 take the place of the gear region 13z and are connected to the third rolled-on surface element 13 or formed therefrom. The bolt disc 71 is connected to the first rolled-on surface element 11 or formed therefrom. Here the eccentric 72 drives the cam disc 75 with n curve sections, which roll over the n+1 bolts 73. Each revolution of the drive moves the output formed by the bolt disc 71 further by one curve section. A high rotational speed reduction thus also arises.

Since cycloidal drives are eccentric drives, wherein cam discs transfer torques in a rolling manner, they manage without gears and are not subjected to shear forces. Sudden failures are precluded.

In yet other embodiments, instead of the planetary-transmission-type transmission mechanism of FIG. 1, a ball translation drive, (ball-type speed reducer) can also be used, wherein balls are disposed between a first and a second structural element of the transmission, wherein the balls in the first structural element are guided in a groove (for example, an elliptical groove) and in the second structural element in a groove (for example, a cycloidal groove). An example for such a transmission is described, for example, in U.S. Pat. No. 5,286,236. High step-ups from one to one hundred, and with an appropriate combining, up to thousands are also achievable with such transmissions with small installation space requirements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearing transmissions.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolling-element bearing transmission, comprising:
a rotor configured to rotate a shaft relative to a stator; and
a rotatable output ring comprising a first rolled-on surface element;
the shaft comprising at least one second rolled-on surface element; and
the stator comprising a third rolled-on surface element;
the rolling-element bearing transmission further including:
a first plurality of rolling elements between the first rolled-on surface element and the at least one second rolled-on surface element and a second plurality of rolling elements between the third rolled-on surface element and the at least one second rolled-on surface element; and
transmission means for transmitting a rotary motion of the shaft to the output ring with a speed reduction such that the output ring rotates at a lower speed than the shaft,
wherein a bearing formed by the first plurality of rolling elements, the first rolled-on surface element and the at least one second rolled-on surface element is the only bearing acting on the output ring.

2. The rolling-element bearing transmission according to claim 1, wherein the transmission means is configured such that the speed reduction is from 1:2 to 1:20000.

3. The rolling-element bearing transmission according to claim 1, wherein the transmission means is configured such that the speed reduction is from 1:50 to 1:500.

4. The rolling-element bearing according to claim 1 wherein the at least one second rolled-on surface element comprises a first second rolled-on surface element and a second second rolled-on surface element.

5. The rolling-element bearing transmission according to claim 1,
wherein the first and second pluralities of rolling elements are disposed axially adjacent to each other, and
wherein the first and second pluralities of rolling elements are configured as a single, double, or multi-row set of rolling elements, and
wherein the rolling elements of the first and second pluralities of rolling elements are configured as balls or as rollers, and
wherein the first plurality of rolling elements and the first rolled-on surface element are configured as a double-row angular contact ball bearing.

6. The rolling-element bearing transmission according to claim 1, wherein the first plurality of rolling-elements are grease or oil-lubricated and including at least one seal body configured to seal the grease or oil and wherein the first plurality of rolling-elements are retained in a bearing cage.

7. The rolling-element bearing transmission according to claim 1, wherein the transmission means comprises a planetary transmission including at least one double gear having a first gear part with teeth engaged with internal teeth in the stator and a second gear part having teeth engaged with internal teeth in the output ring, and wherein an axis of rotation of the at least one double gear is configured to revolve around an axis of rotation of the shaft.

8. The rolling-element bearing transmission according to claim 1,
wherein the stator comprises internal gear teeth and the output ring comprises internal gear teeth, and
wherein the at least one second rolled-on surface element comprises a first second rolled-on surface element and a second second rolled-on surface element,
the rolling-element bearing transmission further comprising:
a plurality of double gears each comprising a first gear having teeth and a first diameter and a second gear having teeth and a second diameter larger than the first diameter, the first gear and the second gear of each double gear being fixedly mounted to a shaft for rotation with the shaft, the shaft connecting the first second rolled-on surface element to the second second rolled-on surface element and the teeth of the first gear of each double gear being meshed with the internal gear teeth of the stator and the teeth of the second gear of each double gear being meshed with the internal gear teeth of the output ring.

9. The rolling-element bearing transmission according to claim 1, wherein the transmission means comprises a strain wave gear.

10. The rolling-element bearing transmission according to claim 9, wherein the strain wave gear includes a flexspline and wherein an external gear of the flexspline engages the internal gear of the output ring.

11. The rolling-element bearing transmission according to claim 1, wherein the transmission means comprises a cycloidal drive including a cam disc, an eccentric driving the cam disc, bolts as rolling partners for the cam disc, and a bolt disc drivable by the cam disc, wherein the eccentric is connected to the rotor or the at least one second rolled-on surface, the bolt disc is connected to the rotor or to the first rolled-on surface element, and the bolts are provided on the stator element or on the third rolled-on surface element.

12. The rolling-element bearing transmission according to claim 1, wherein the transmission means comprises a ball translation drive, wherein balls are disposed between a first and a second component of the transmission, wherein the balls in the first component are guided in an elliptically shaped groove and in the second component in a cycloidally shaped groove.

13. A rolling-element bearing transmission comprising:
a rotor configured to rotate a shaft relative to a stator;
a rotatable output ring comprising a first rolled-on surface element, the output ring comprising an internal gear;
the shaft comprising a first second rolled-on surface element and a second second rolled-on surface element axially spaced from the first second rolled-on surface element by a gap;
the stator comprising a third roiled-on surface element and comprising an internal gear;
a first plurality of rolling elements between the first rolled-on surface element and the first second rolled-on surface element and a second plurality of rolling elements between the third rolled-on surface element and the second second rolled-on surface element;
a plurality of double gears each comprising a first gear having teeth and a first diameter and a second gear having teeth and a second diameter larger than the first diameter, the first gear and second gear of each double gear being fixedly mounted to a shaft for rotation with the shaft, the shaft connecting the first second rolled-on surface element to the second second rolled-on surface element and the teeth of the first gear of each double gear being meshed with the internal gear of the stator and the teeth of the second gear of each double gear being meshed with the internal teeth of the output ring;
wherein a bearing formed by the first plurality of rolling elements, the first rolled-on surface element and the at least one second rolled-on surface element is the only bearing acting on the output ring.

* * * * *